July 9, 1963    J. P. FARQUHAR ETAL    3,097,255
CORRECTOR FOR IMAGE-FORMING OPTICAL ASSEMBLIES
Filed July 16, 1954    6 Sheets-Sheet 1
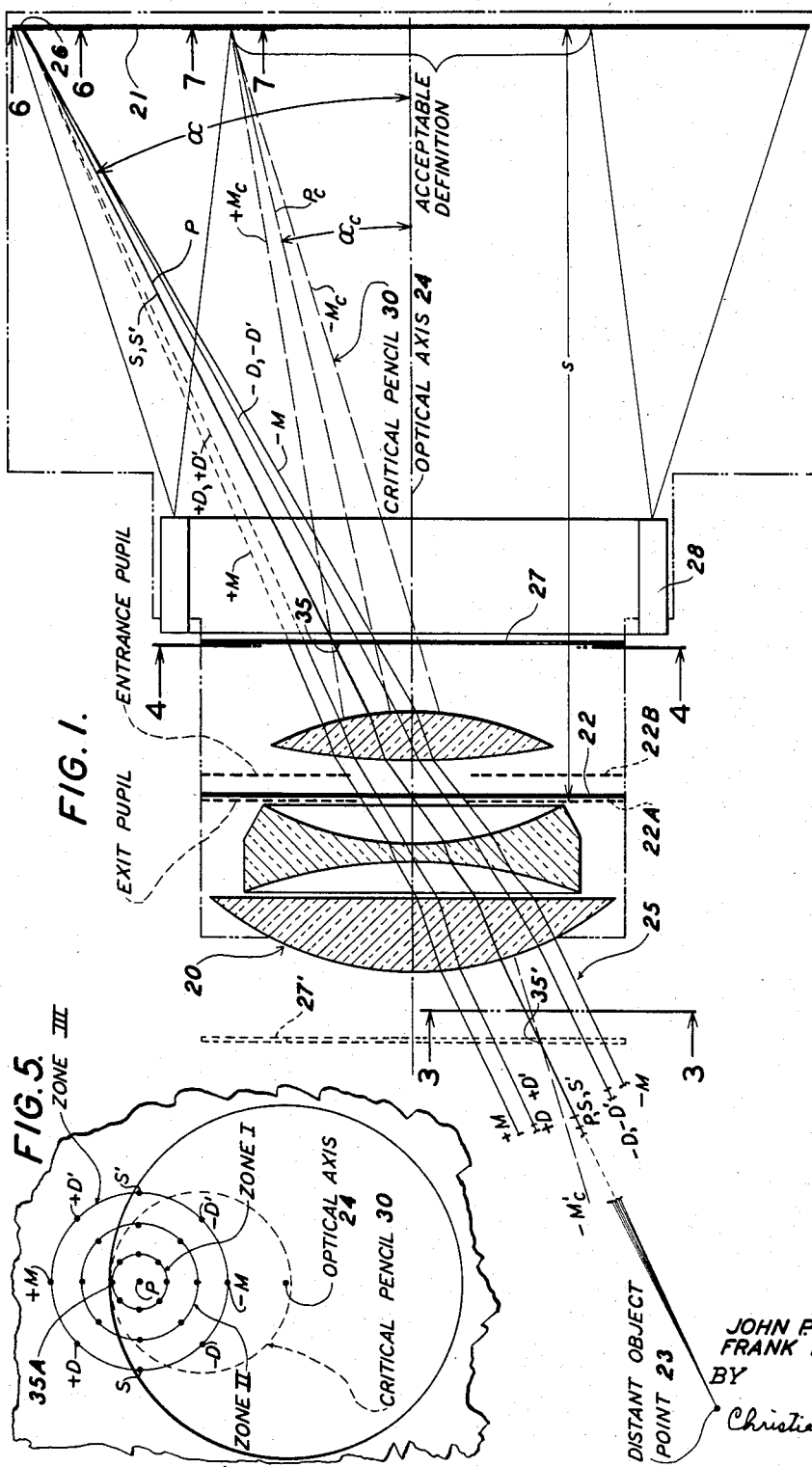
INVENTORS.
JOHN P. FARQUHAR
FRANK F. CRANDELL
BY
Christie, Parker & Hale
ATTORNEYS

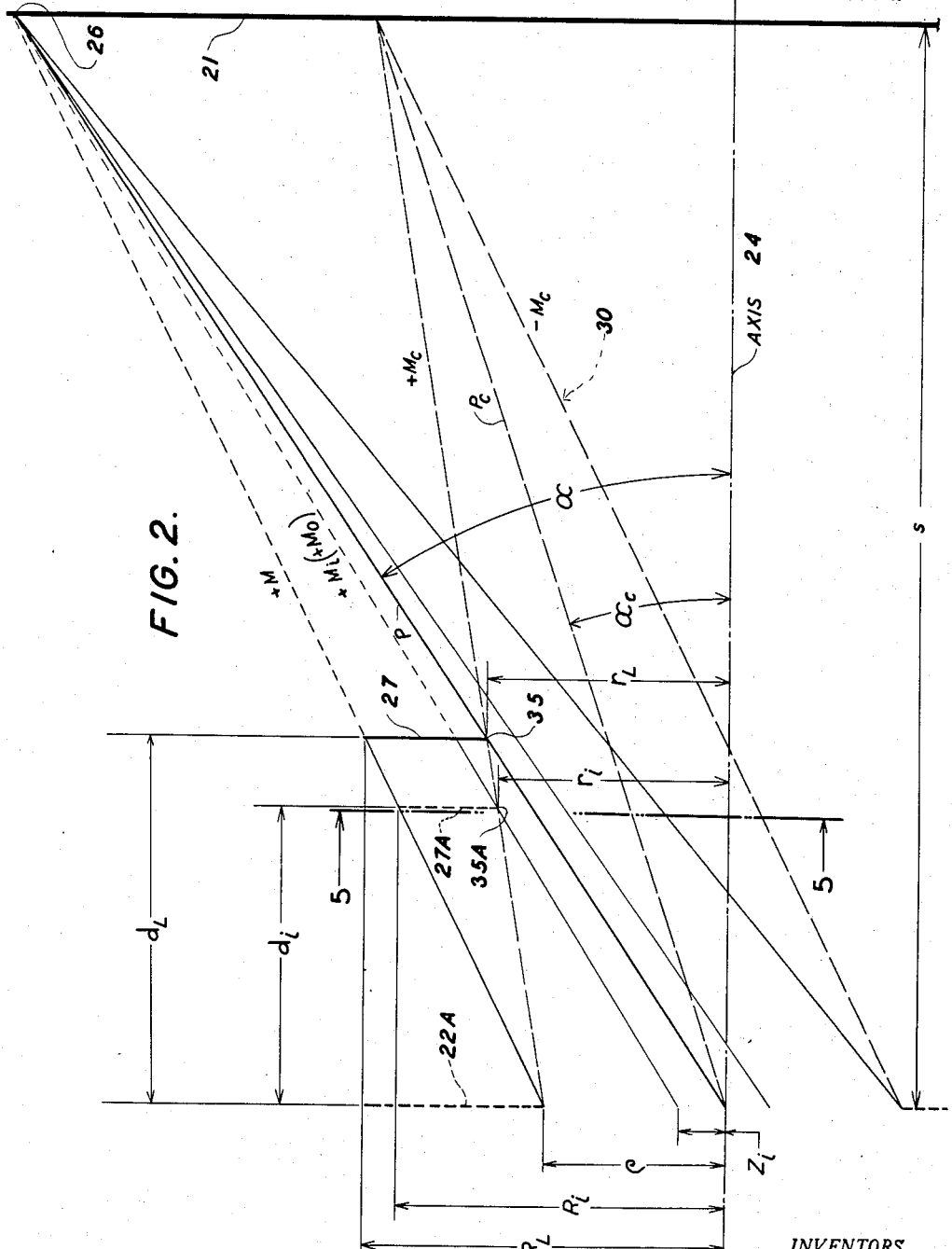

July 9, 1963   J. P. FARQUHAR ETAL   3,097,255
CORRECTOR FOR IMAGE-FORMING OPTICAL ASSEMBLIES
Filed July 16, 1954   6 Sheets-Sheet 3
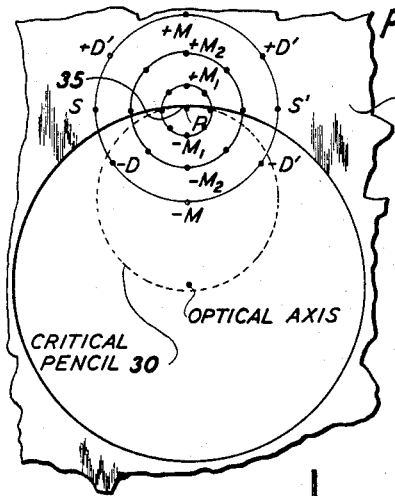
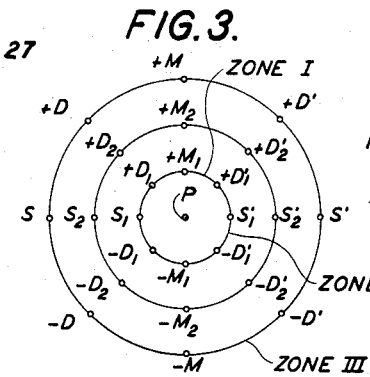
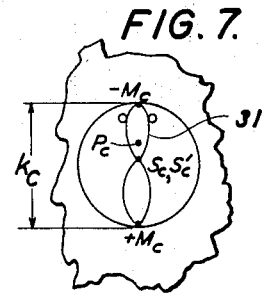
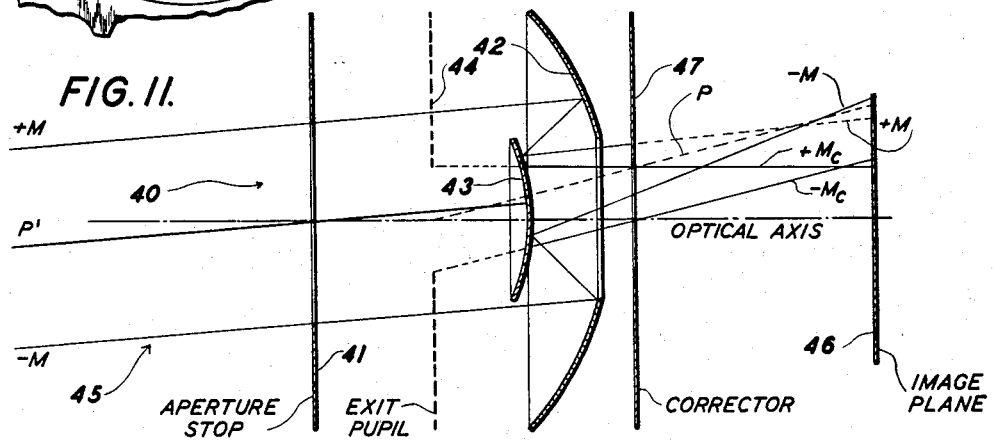
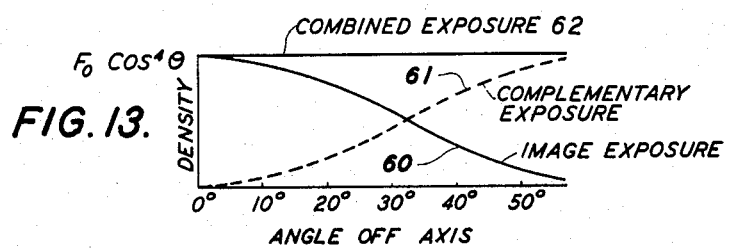
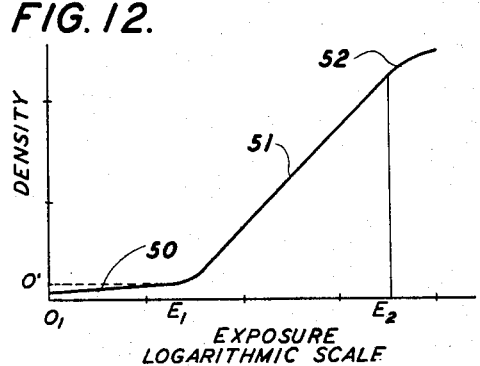
INVENTORS.
JOHN P. FARQUHAR
FRANK F. CRANDELL
BY Christie, Parker & Hale
ATTORNEYS

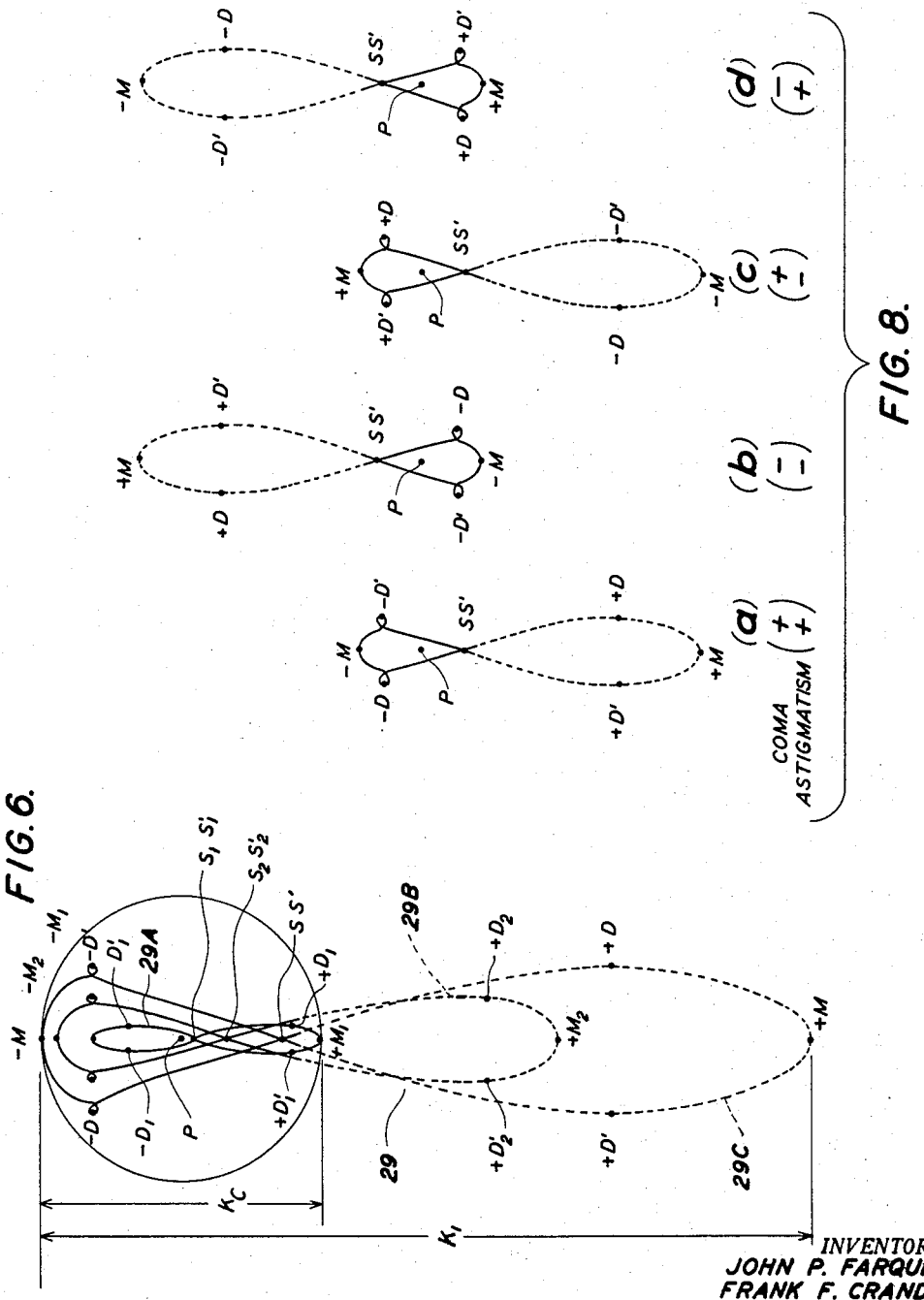

July 9, 1963 J. P. FARQUHAR ETAL 3,097,255
CORRECTOR FOR IMAGE-FORMING OPTICAL ASSEMBLIES
Filed July 16, 1954 6 Sheets-Sheet 5

INVENTORS.
JOHN P. FARQUHAR
FRANK F. CRANDELL
BY
Christie, Parker & Hale
ATTORNEYS INVENTORS.
JOHN P. FARQUHAR
FRANK F. CRANDELL
BY
Christie, Parker & Hale
ATTORNEYS 3,097,255
CORRECTOR FOR IMAGE-FORMING OPTICAL ASSEMBLIES
John P. Farquhar, Los Angeles, Calif. (11570 San Pablo Ave., El Cerrito, Calif.), and Frank F. Crandell, 3221 Milton St., Pasadena 10, Calif.
Filed July 16, 1954, Ser. No. 443,892
13 Claims. (Cl. 88—57)

This invention relates to the correction of aberration in image-forming optical assemblies having either refractive or reflective elements or both. More specifically, the invention provides novel apparatus and method for the correction of "off-axis" aberrations, such as astigmatism and coma.

Under ordinary circumstances, an image-forming lens or mirror, or a system of such lenses or mirrors will not produce a perfect image. The defects of the image arise in various ways from geometric causes and do not necesarily result from errors in manufacture of the optical elements. / This invention is concerned with the correction of imperfections arising from geometric causes.

To simplify the following discussion, refracting lens systems are used predominantly to illustrate the principles of the present invention; however, as will be shown, reflecting systems and combined reflecting and refracting systems are equally susceptible to improvement by the present invention.

Ordinarily, a lens designer is concerned with several types of aberration such as coma, astigmatism, spherical, chromatic and others, and it is impossible to design lenses which will correct completely for all of these aberrations at the same time. It even happens sometimes that the process of eliminating one type of aberration intensifies another. A troublesome feature in lens design is that while corrections for comatic and astigmatic aberrations can be built into an optical system simultaneously, such correction restricts correction for chromatic and spherical aberration and other aberrations, and vice versa.

For example, if an exceedingly sharp image is desired, the system needs especially fine correction for spherical and chromatic aberration; and this can be accomplished only by reducing the size of the field of view to avoid excessive comatic and astigmatic aberration. A wide-angle photographic lens, on the other hand, calls for freedom from coma and astigmatism, and then the aperture of the lens must remain small to avoid large spherical aberration.

Due to the above inherent properties of optical systems, wide-angle lenses rarely have relative apertures greater than ⅒ of the focal length, while optical systems with larger relative apertures must necessarily have small fields of view.

The present invention provides means to reduce or substantially eliminate comatic-astigmatic aberration in an optical system even though the system may be provided with correction for spherical and chromatic aberration, curvature of field and distortion. Thus, a lens with a relatively large aperture can be used as a wide-angle lens. This reduces the exposure time ordinarily required by wide-angle lenses.

Comatic and astigmatic aberration are due to light passing through an optical system at an angle oblique to the optical axis of the system. This occurs when the light rays emanate from an object source located off the optical axis. Depending on the portion of the optical system which the various light rays enter and the angle which they form with the curved surfaces of the optical system, the light rays are refracted in varying degrees to form an image of the point object source. However, due to comatic and astigmatic aberration, these off-axis light rays are not all focused at a point and thus do not form a perfect image of the object point.

If an optimum focal plane is selected on which the majority of the light rays from an object point are focused, or at least confined to a relatively small area, a few of the remaining light rays will impinge on the plane at points relatively far removed from the focus "point" of the other rays. This results in an image which is "smeared." In the presence of coma, if the smeared image is viewed under a microscope, it will appear to be in the shape of a comet having a relatively bright spot for its head with a large, faint "tail" extending from the head, growing fainter toward the end of the tail. The tail is undesirable because it causes the image to be a fuzzy reproduction of the object, due to both its excessive size and gradual fading of intensity. In other words, the definition of the composite image (i.e., the aggregate of many individual image patterns) varies inversely, within limits, with the size of the individual image patterns, and the sharpness varies directly with the abruptness of demarcation (or intensity gradient) at the boundary of the image and the surrounding area. The light rays which form the tail of the aberrated image are those rays which are farthest from the optical axis either before or after they have passed through the aperture of the optical system, depending upon the type of comatic and astigmatic aberration involved.

The present invention improves images subjected to comatic and astigmatic aberration by the use of an optical mask to intercept only those light rays which form the tails of the smeared images thus improving the definition and sharpness of the composite image. Depending upon the type of aberrations involved, an optical mask is positioned around the optical axis adjacent the aperture of the optical system, either in front of the aperture or behind it, and in some cases in both positions. In most cases the optical mask is annular in shape, however, as explained below, it may be of various other shapes.

For the purpose of describing the invention, the term "optical mask" designates an element used in conjunction with an image-forming optical system to intercept light rays originating from an object whose image is to be formed in a focal plane, and the optical mask is of such character as to intercept only the rays forming an undesirable tail of the image.

Thus, although some of the light rays from the object point are intercepted or diverted, an improved image of the object results. For example, an opaque element may be used to prevent the intercepted light rays from reaching the image plane; however, such corrective means inevitably result in the loss of some of the image-forming light. This is sometimes an undesirable effect because it increases the tendency present in all optical systems to produce an image which decreases in brightness with increasing distance from the optical axis. Therefore, in a preferred form, the invention is provided with means for utilizing or supplementing the intercepted light rays. This result may be achieved by using a transparent, translucent, or reflecting optical mask and directing the light intercepted by the mask over the image plane, in which photographic film is ordinarily disposed, to effect a degree of latent image intensification to compensate for the reduced light intensity. This same result may also be achieved by using an opaque optical mask in conjunction with a supplemental light source which supplies light to compensate for the intercepted light. The manner in which this is accomplished is hereinafter described. Thus, in a preferred form, the invention includes means to compensate for the uneven illumination produced by an optical system by distributing light over the image plane to achieve more nearly uniform illumination.

These and other aspects of the invention will be understood from the following detailed description taken in conjunction with the accompanying drawings in which:

FIG. 1 is a schematic axial section of a conventional lens system illustrating an embodiment of the invention in which a pencil of light rays from an object source is shown being focused on an image plane;

FIG. 2 is an enlarged schematic axial section of part of FIG. 1 showing in detail certain predetermined and calculated dimensions of the mask as related to various light rays from the image;

FIG. 3 is a view taken on line 3—3 of FIG. 1 showing three concentric zones of light of the pencil of rays illustrated in FIG. 1;

FIG. 4 is a view taken on line 4—4 of FIG. 1 illustrating the operation of the optical mask in a first position;

FIG. 5 is a view taken on line 5—5 of FIG. 2 showing operation of the optical mask in a second position;

FIG. 6 is an enlarged view of a portion of the image plane taken on line 6—6 of FIG. 1 showing image curves formed by the rays from the three concentric zones shown in FIG. 3;

FIG. 7 is an enlarged view of another portion of the focal plane taken on line 7—7;

Figure 9:
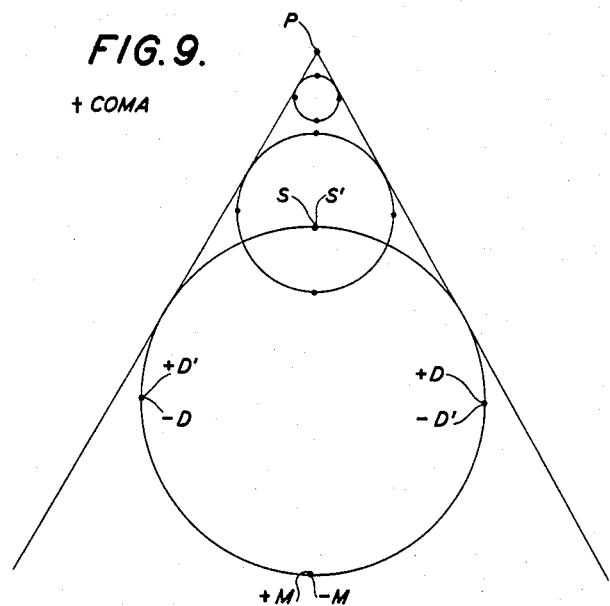
Figure 10:
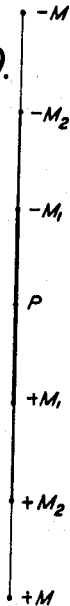
Figure 14:
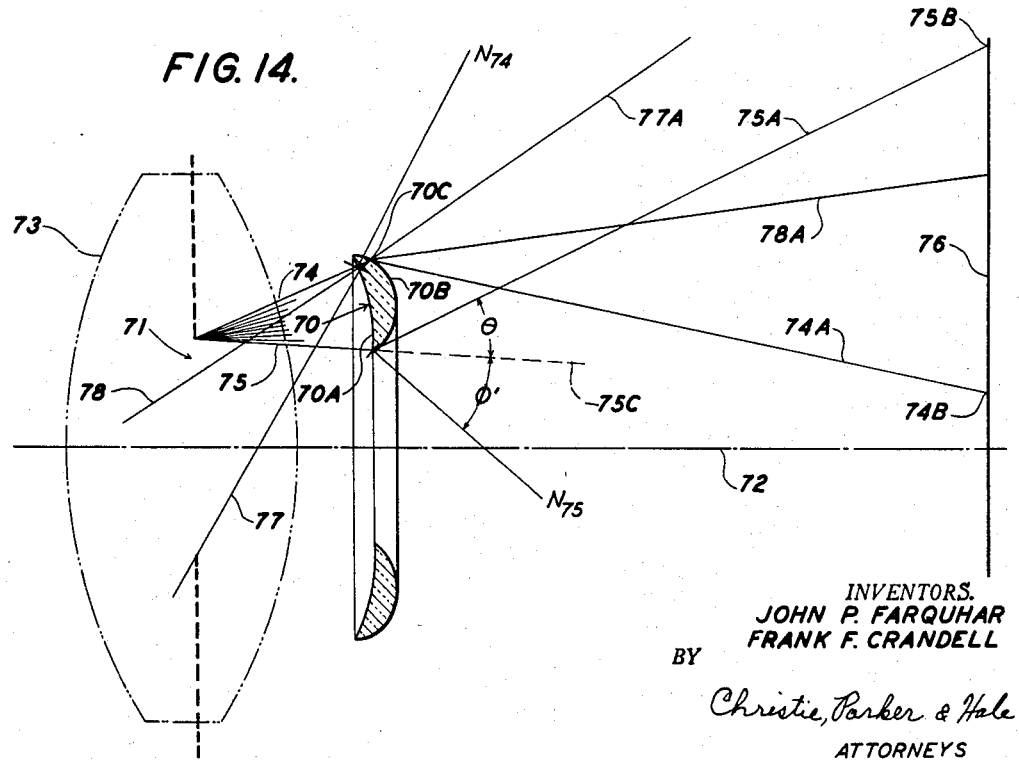
Figure 15:
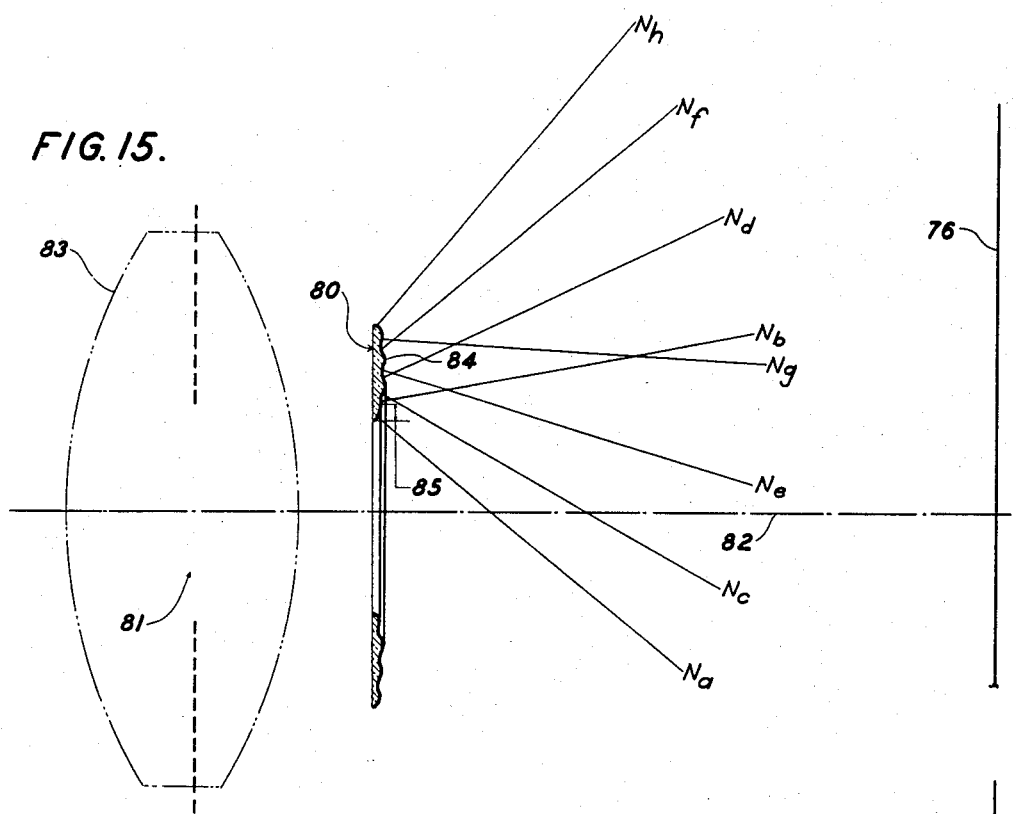
Figure 16:
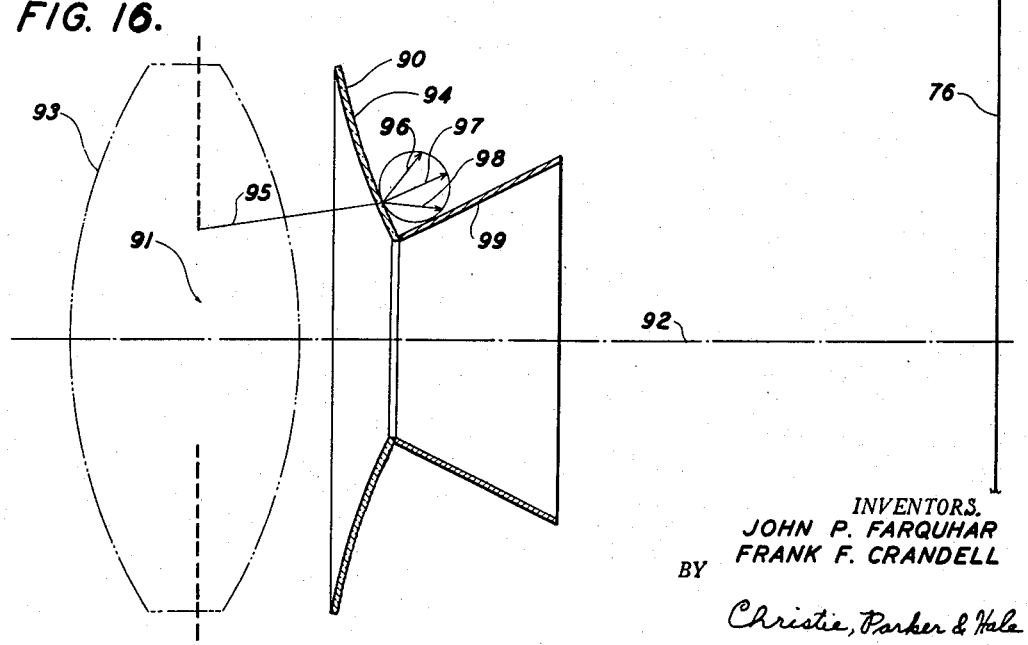

FIG. 8(a), (b), (c), (d) shows an enlarged view of an image pattern formed by a single zone of light for each of the four combinations of positive and negative coma and astigmatism;

FIG. 9 is an enlarged view schematically illustrating the image pattern for the case of pure postive coma showing image curves formed by the rays from the three concentric zones shown in FIG. 3;

FIG. 10 is an enlarged view schematically illustrating the sagittal image pattern for the case of pure positive astigmatism;

FIG. 11 is an axial section of an image-forming system using reflective elements illustrating the application of the invention to such a system;

FIG. 12 is a hypothetical HD curve illustrating the density of an image produced as a function of the log of exposure on a conventional photographic emulsion;

FIG. 13 is a graphical representation of the distribution of illumination taken along a cross-section of a photographic image plane passing through the optical axis and illustrating also the effect on latent image intensification which is produced by the supplemental light distribution illustrated in FIG. 1;

FIG. 14 is a schematic axial section of a transparent optical mask adapted to spread light on the image plane in a compensating manner by the refraction of light intercepted by the mask;

FIG. 15 is a schematic axial section of another form of a transparent optical mask adapted to spread intercepted light in a compensating manner on the image plane by refraction; and FIG. 16 is a schematic axial section of a translucent optical mask adapted to spread intercepted light in a compensating manner on the image plane by diffusion.

Referring to FIG. 1, a conventional photographic objective 20, adapted to form images on an image plane 21 is equipped with a conventional diaphragm 22 which controls the relative aperture of the objective. Dotted lines 22A, 22B indicate the exit and entrance pupils, respectively, of the objective. The distance from the exit pupil to the image plane is designated as $s$. Conventionally, the exit pupil is defined as the image of the aperture formed by the objective elements to the rear of the aperture. The entrance pupil is defined as the image of the aperture formed by the objective elements in front of the aperture. A distance object point 23 displaced from the optical axis 24 of the objective emits a pencil 25 of light rays which are substantially parallel as they reach the objective. The pencil is of such shape as to fill the aperture of the objective. The optical axis and the object point define the plane in which the view of FIG. 1 is taken.

FIG. 3 illustrates in cross-section perpendicular to the optical axis the relative disposition of eight light rays $+M$, $+D'$, $+D$, $S$, $S'$, $-D'$, $-D$, $-M$, in an outermost zone III of the transmitted pencil of light emanating from the distant point source, plus the principal ray P, from the same source, which passes through the center of the aperture. The inner and intermediate concentric circles I and II, respectively, of FIG. 3, represent an inner and an intermediate zone of the same pencil. The M rays, D rays and S rays are distributed in these zones I and II exactly as the outermost zone III. The rays in zone II are designated by a subscript 2 and in zone I by a subscript 1. Thus in zone II the eight rays corresponding to the rays in zone III are $+M_2$, $-M_2$, $+D_2$, $-D_2$, $+D'_2$, $-D'_2$, $S_2$ and $S'_2$; and in zone I the eight rays are $+M_1$, $-M_1$, $+D_1$, $-D_1$, $+D'_1$, $-D'_1$, $S_1$ and $S'_1$. The view shown by FIG. 3 is representative of the zones at the aperture and is a close approximation of sections perpendicular to the axis at the entrance pupil and exit pupil or in any such section perpendicular to the axis not too close to the image where aberration effects become pronounced. The two rays $+M$, $-M$, which are in the plane (shown as vertical in FIG. 3) defined by the optical axis and the point source, are conventionally called "meridional light rays." The two light rays $S$, $S'$ which graze the ends of the horizontal diameter of the aperture (see FIG. 3) are termed "sagittal rays." The remaining four rays are designated as $+D$, $+D'$, $-D$ and $-D'$, depending upon the quadrant in which they are located. The rays of the pencil of light in the two quadrants closest to the optical axis prior to the pencil passing through the objective are designated as plus rays; and those rays in the two quadrants farthest from the optical axis prior to the passing of the pencil of light through the objective are designated as minus rays. The central or principal ray P lies coaxially within the pencil and by definition passes through the center of the aperture.

The pencil of light passing through the objective forms an image pattern on the focal plane in an area 26 of FIG. 1 (also shown in FIG. 2). In accordance with conventional representation, the rays forming the image at 26 are drawn as though to be coming from the exit pupil of the objective.

FIG. 4 illustrates which of the individual light rays of the pencil of light are intercepted by an optical mask 27 in a limiting position, which is defined below. To illustrate the invention, the optical mask is shown as being a ring. However, as explained below, the mask may be of a great variety of shapes. In the example illustrated in FIGS. 1 and 4, the optical mask is shown as being opaque and positioned to prevent the $+M$, $+D$, $+D'$, $S$, and $S'$ light rays from reaching the image plane. A supplemental annular light source 28 is shown schematically as being disposed adjacent the mask so that non-image-forming light is spread in a compensating manner over the image plane in a way and for a purpose described in detail below. As will also be explained later, the optical mask shown in FIGS. 1 and 4 may be transparent, translucent or reflecting and arranged so that the light which it intercepts is spread in a compensating manner over the image area.

FIG. 5 illustrates which of the individual light rays of the pencil of light 25 are intercepted by the optical mask in the optimum position which is defined below.

For illustrative purposes, the objective is assumed to have coma and astigmatism of like signs, i.e., either plus coma and plus astigmatism or minus coma and minus astigmatism; therefore, the optical mask is positioned behind the objective. For objectives with coma and astigmatism of unlike signs the mask should be disposed in front of the objective as illustrated by dotted lines at 27'.

FIG. 6 is an enlarged view of the area indicated at 6—6 of the focal plane in FIG. 1 illustrating a typical shape 29 which the image formed by the rays of the three zones I, II, and III (see FIG. 3) of the pencil from the point source would have if the optical mask were not in its position as illustrated in FIG. 1, and if plus coma and plus astigmatism are present in the objective. Zones I, II and III form an inner image curve 29A, an intermediate image curve 29B, and an outer image curve 29C, respectively. The maximum effective diameter or dimension of the image 29 is indicated as $k_1$. The dotted portion of the image curve illustrates that part of the image curve which the corrector prevents from reaching the image plane. In the case illustrated, it is the $+M$, $+D$, and $+D'$ light rays which are spread out in the form of a tail over a relatively large area while the remaining rays are concentrated in a relatively small area which may be referred to as the "head." Thus it is possible to remove a large portion of the smeared image while still leaving a relatively large proportion of the total light originating from the object point. FIG. 6 also shows that the focal plane is at the "sagittal focus" of the objective, i.e., where the sagittal rays are focused. Although the focal plane may be located at other positions, the optimum plane for concentrating the maximum amount of light in the smallest area has been found to be at or near the sagittal focus, and therefore the invention is explained on the basis of using the sagittal focus as the focal plane.

The principles involved in the calculation of the correct position for the optical mask and the calculation of its proper external and internal diameters are illustrated in FIG. 1 and FIG. 2.

A second pencil 30 of rays $+M_c$, $-M_c$, $P_c$, $S_c$, $S'_c$ is shown in FIG. 1 and FIG. 2. The second pencil is assumed to originate from a point (not shown) at the left of the objective so displaced from the optical axis that the principal ray $P_c$ exits from the objective to form an angle $\alpha_c$ with the optical axis which is termed the "maximum acceptable coma-astigmatism angle." The pencil 30 of rays is called the "critical pencil" because it produces the maximum acceptable degree of comatic-astigmatic aberration, i.e., an amount of aberration which is equal to an amount set as the maximum tolerable for the particular application of the objective. FIG. 7 shows an enlarged view of the image formed by the outer zone of the critical pencil; the maximum diameter of the image is $k_c$. The other pencil of rays (previously identified as $+M$, $+D'$, $+D$, $S$, $S'$, $-D'$, $-D$, $-M$, $P$) originates from the point 23 at the greatest angle for which the objective is to be used and therefore is imaged at the extreme edge of the image field (area 26, as shown in FIGS. 1 and 2). The principal ray $P$ exits from the objective to form an angle $\alpha$ with the optical axis, which may be called the "marginal field angle."

Ordinarily, the maximum acceptable coma-astigmatism angle $\alpha_c$ is explained as follows: As pointed out above, every photographic objective is affected by various types of aberration. Spherical aberration, for example, is the imperfection in the photographic image which is due to the fact that the different zones of the lens have slightly different focal lengths. Thus, in the presence of spherical aberration it is impossible to focus a point source of light to produce a point image even when the point is on the optical axis. This results in an unavoidable blurred image of circular shape, the diameter of which is referred to as the diameter of the circle of confusion.

For extra-axial images which, in the presence of coma and astigmatism, are not circular in shape, the diameter of the circle of confusion can be considered the diameter of the circle circumscribed about the image figure, shown as $k_1$ in FIG. 6 for the first pencil of rays and as $k_c$ for the critical pencil of rays. The diameter of the circle of confusion can be used as a measure of the degree of aberration. The maximum acceptable circle of confusion is one associated with the maximum acceptable degree of total aberration, i.e., it is an amount set as the maximum tolerable for the particular application of the objective.

The seriousness of coma and astigmatism, that is, the size of the tail portion of the image and the extent thereof, increases as the angle of the off-axis object increases, being zero on the optical axis. There is some critical angle at which the diameter of the circle of confusion will become equal to the diameter of the maximum acceptable circle of confusion, and this critical angle is termed the maximum acceptable coma-astigmatism angle. It is at least as large as the angle at which the comatic-astigmatic image is discernible over the effect of other aberrations. When the axial aberrations are small, the maximum acceptable circle of confusion is a more or less arbitrary value, within certain limitations, being determined by such variables as the desired quality of the image or by the quality of the film used to record the image.

The larger comatic-astigmatic image at the extreme edge of the image field produced by rays entering from the maximum angle for which the objective 20 is to be used is illustrated in FIG. 6. It is desirable to correct, that is, to reduce the extent of all comatic-astigmatic images by reducing their tail portions in the manner discussed above, ranging in size from that shown in FIG. 7 to that shown in FIG. 6, i.e., reduce the images of all points lying at an angle to the optical axis greater than $\alpha_c$ and less than or equal to $\alpha$.

As previously described, the removal of the tail portion of the comatic-astigmatic image illustrated in FIG. 6 is accomplished by intercepting the $+M$ and the $+D$ rays (and those rays near these rays), but the principal ray $P$ from any point source usually must not be intercepted. Coupling this with the fact that it is not appreciably beneficial to intercept the $+M_c$ ray from a point at or less than the maximum acceptable coma-astigmatism angle, the intersection of the $+M_c$ ray from the maximum acceptable coma-astigmatism angle object point and the $P$ ray from the marginal field angle object point determines a limiting point 35 (see FIG. 1 and FIG. 2) for the inside edge of the optical mask element which is at a distance or radius $r_L$ from the optical axis.

The outside edge distance from the optical axis, or outside radius $R_L$ of the optical mask is determined by the fact that it must extend at least far enough to intercept the $+M$ ray and the adjacent rays from the objects located at the maximum angle for which the objective is designed. Preferably, the outside radius is so large that the outer edge of the mask extends well beyond the $+M$ ray, such as is illustrated in FIG. 1, though in some cases, such as reflecting telescopes, it is advantageous for the outer edge of the mask to extend no further than the $+M$ ray.

In addition to determining the limiting inside and outside radii of the optical mask, the ray combination just described determines the limiting distance of the inside edge of the optical mask from the exit pupil of the objective measured along a line parallel to the optical axis. This distance is indicated by the reference character $d_L$ in FIG. 2. If the optical mask is placed at a greater distance than $d_L$ from the exit pupil, the inside radius must be made sufficient to pass, unaffected, the principal ray $P$ from the marginal field angle object point, and thus cannot be small enough to make the desired interception of the $+M$ rays of images outside the angle of maximum acceptable coma-astigmatism. However, effective coma-astigmatism correction can be accomplished by locating the optical mask closer than $d_L$ to the exit pupil.

Thus, as indicated in FIG. 1 and FIG. 2, $d_L$, $r_L$ and $R_L$ represent limiting values only. Slight deviations from the exact limiting values given can be made for purpose of compromise with other factors while still accomplishing substantial correction of comatic and astigmatic aberration. For example, the maximum light intensity in the comatic-astigmatic image may not coincide exactly with the principal ray and thus slight deviations from the above limits may be required. Generally, however, the useful positions of the optical mask when used to the rear of the aperture diaphragm will be between the aperture diaphragm and the limiting position $d_L$ at which the inside edge of the optical mask is determined by the intersection point 35.

The maximum acceptable circle of confusion, the focal length and distance, the position and size of the aperture diaphragm and of the entrance and exit pupils, the marginal field angle, and the particular configuration and combination type of the comatic-astigmatic image and its change in size with change in off-axis angle are all ascertainable factors of any lens assembly. They are readily determined by relatively simple measurements and calculations with the aid, in some cases, of catalog information. Thus, knowing the last-mentioned factors, the limiting position or range of positions at which the optical mask may be placed may readily be calculated. The inside and outside radii of the optical mask for any position in such range may also be calculated from these factors.

The various dimensions involved are shown schematically in FIG. 2 in which the inside edge of the optical mask is shown positioned at the limiting intersection 35 and also at an intermediate position 35A. The formulae for determining such positions derived from the values and considerations above listed are as follows:

Referring to the symbols employed in FIG. 1 and FIG. 2, $\rho$ is the effective radius of the exit pupil; $s$ is the distance from the exit pupil to the image plane 21; $\alpha_c$ is the maximum angle of acceptable coma-astigmatism; $\alpha$ is the marginal field angle; $d_L$ is the limiting axial distance of the inside edge 35 of the optical mask from the plane of the exit pupil; $r_L$ is the distance from the axis of the inside edge 35 of the optical mask element at the limiting axial distance $d_L$; $R_L$ is the minimum distance from the optical axis of the outside edge of the optical mask for the case in which both the inside and the outside edges of the optical mask lie in a plane which is perpendicular to the optical axis; $d_i$ is an intermediate axial distance from the plane of the exit pupil of the inside edge of the optical mask less than or equal to $d_L$; $r_i$ is the distance from the axis of the inside edge of the optical mask at the intermediate distance $d_i$; and $R_i$ the minimum distance from the axis of the outside edge of the optical mask when the outside edge is at the distance $d_i$ from the plane of the exit pupil, $$\text{(I)} \qquad d_L = \frac{\rho}{\tan \alpha - \tan \alpha_c + \frac{\rho}{s}}$$

$$\text{(II)} \qquad r_L = d_L \tan \alpha$$

$$\text{(III)} \qquad r_i = \rho + d_i \left( \tan \alpha_c - \frac{\rho}{s} \right)$$

$$\text{(IV)} \qquad R_i = \rho + d_i \left( \tan \alpha - \frac{\rho}{s} \right)$$

where $r_L$ is also found by setting $d_i = d_L$ in III, and $R_L$ by setting $d_i = d_L$ in IV.

For each intermediate distance $d_i$ of the optical mask, with corresponding internal radius $r_i$ given by Formula III, there is a $+M$ ray of a zone which just grazes the inner edge of the optical mask. This ray is shown as $+M_1$ belonging to an internal zone having an exit pupil of radius $Z_i$ as formed by projecting $M_1$ in a straight line back to the plane of the exit pupil. Further expressions for $d_i$ and $r_i$ involving $Z_i$ are $$\text{(V)} \qquad d_i = \frac{\rho - Z_i}{\tan \alpha - \tan \alpha_c + \frac{\rho - Z_i}{s}}$$

$$\text{(VI)} \qquad r_i = Z_i + d_i \left( \tan \alpha - \frac{Z_i}{s} \right)$$

At the limiting position $Z = 0$ and formulae V and VI become I and II, respectively. Otherwise $Z_i$ is readily measured or calculated from $d_i$ using Formula V.

Within the range of useful positions for the optical mask there is one of especial usefulness which depends on a particular value of $Z_i$. The increase in seriousness of the coma and astigmatism, that is the size and extent of the tail portion of the image, with increase of the angle to the off-axis object (or image) has been discussed above. There is also, at any fixed off-axis angle, a similar increase in the seriousness of these aberrations, i.e., especially the size and extent of the image tail, with the increase in the diameter of the aperture diaphragm. In fact for primary aberrations, the focus of the sagittal rays is displaced from the principal ray in proportion to the square of the radius of the corresponding zone at the aperture, exit, or entrance pupil; so that the tails of the image curves formed by increasingly smaller zones tend to crowd up rapidly toward the principal ray. The head portions of these image curves also tend toward the principal ray, but at a slower rate. This effect is illustrated in FIG. 6. The distance from the principal ray of the sagittal foci for the three image curves of FIG. 6 bear the relative values of 9, 4 and 1, whereas the radii of the corresponding zones of FIG. 3 bear the relative values 3, 2 and 1, respectively. The same effect is shown for pure coma in the images of FIG. 9. The rapid reduction of their size and the crowding of their tails toward the principal ray of the image curves formed by successively smaller zones, along with the comparison described above, of the size of the tail to the head of each zonal image, explains the concentration of light in the head portion near the principal ray of the composite image formed by all zones.

Referring to FIG. 6, the image 29A is just contained within the predetermined maximum acceptable circle of confusion of diameter $k_c$, which also contains the entire head portions of the image curves 29B and 29C; and such an image curve as 29A is formed by a particular inner zone, shown as zone I in FIGS. 3 and 5, which can be called the "maximum zone of acceptable coma-astigmatism." It is advantageous to transmit all the rays of this zone along with the rays from zones of still smaller radius to the image plane in order to obtain the maximum amount of light within the circle of confusion. Thus it is advantageous to transmit the $+M_1$ ray to the end of the tail of image curve 29A in FIG. 6, i.e., the $+M$ ray of the maximum zone of acceptable coma-astigmatism (designated as $M_0$ for the purpose of calculating the optimum position of optical mask) without transmitting the $+M$ rays of zones of greater radius. Inasmuch as it is not appreciably beneficial to intercept the $+M_c$ ray, which comes from a point at the maximum angle of acceptable coma astigmatism or to interrupt $+M$ rays from points at smaller angles, the intersection of the $+M_c$ ray and the $+M_0$ ray determines a point which can be called the optimum intermediate position for the inside edge of the optical mask element.

Substituting $Z_0$ (the radius of the maximum zone of acceptable coma astigmatism) for $Z_i$ in Formulae V and VI, then Equations III, IV, V and VI become equations for the optimum intermediate position by setting $d_i = d_0$, $r_i = r_0$ and $R_i = R_0$. In FIGS. 2 and 5 the point 35A represents the optimum intermediate position of the inner edge of the optical mask when $Z_i$ is considered to be $Z_0$. Since $\rho$, $Z_0$, $\alpha$, $\alpha_c$ and $s$ are readily measured, the optimum position is easily calculated.

Inspection of FIG. 2 shows that the effect of an optical mask at the optimum intermediate position may be approximated by substituting two optical masks, one whose inner edge is grazed by the $+M_c$ ray, placed to the left of the optimum position, and a supplementary one, whose inner edge is just grazed by the $+M_0$ ray, to the right of the optimum position. However, such an arrangement gives a less degree of correction for pencils at angles between $\alpha$ and $\alpha_c$.

Due to the fact that the present system of rays may be traced through on each side of the aperture stop, results similar to those just described may be accomplished by placing optical masks either in back of the diaphragm of the optical assembly as shown, in front of the same, as illustrated by the dotted-line position, or in front and back, depending on the type of aberration present. If the nature of the coma and astigmatism of the optical assembly require an optical mask in front of the optical assembly, the correction is accomplished by intercepting the appropriate rays as previously described. The distances forward from the entrance pupil of the optical assembly and the internal and external radii of the optical mask may be determined by the principles and formulae derived above. The limiting position in front is determined by the intersection of the $-M_c$ and P rays and the optimum intermediate position is determined by the intersection of the rays $-M_c$ and $-M_0$ (the $-M$ ray of the maximum zone of acceptable coma astigmatism). The range of possible positions for all aberration combinations for the optical mask is between the forward and rearward points of intersection of the P ray from the marginal field angle point, and the $-M_c$ ray and $+M_c$ ray, respectively, from the maximum acceptable coma-astigmatism angle point.

In deriving the formulae for the limiting, intermediate and optimum intermediate positions for the optical mask in front of the lens system, the P and $P_c$ rays are determined as described above, but their angles with the optical axis of the lens system are measured, not as they exit from the lens system, but after tracing them back, as they enter the lens system. In fact, with a slight change in definition, the Formulae I through VI given above can be used for the front positions in which cases $d_L$, $d_i$ and $d_0$ are distances forward from the plane of the entrance pupil of the inside edge of the optical mask for the limiting, intermediate and optimum intermediate positions respectively; $r_L$, $r_i$ and $r_0$ are the distances of the inner edge of the optical mask from the optical axis of the distances $d_L$, $d_i$ and $d_0$ respectively; that is, at the limiting, intermediate and optimum intermediate positions, respectively; $R_L$, $R_i$ and $R_0$ are the minimum distances from the optical axis of the outside edge of the optical mask when the outside edge is at the distances $d_L$, $d_i$ and $d_0$, respectively from the plane of the entrance pupil; $\rho$ is the radius of the entrance pupil; $Z_i$ is the radius of the entrance pupil of an internal zone whose $+M$, $M_i$, ray, just grazes the inside edge of the optical mask at the intermediate axial distance $d_i$, and is found by projecting $M_i$ in a straight line to the plane of the entrance pupil; $Z_0$ is the particular value of $Z_i$ for the maximum zone of acceptable coma astigmatism, as defined above; $\alpha$ and $\alpha_c$ are the marginal field angle and the maximum acceptable coma-astigmatism angle respectively, as measured between the optical axis and the principal rays before entering the lens system; and $s$ is the object distance measured parallel to the axis from the plane of the entrance pupil.

Similarly to the case with the optical mask to the rear, $\rho$, $Z_0$, $\alpha$, $\alpha_c$ and $s$ are readily measured, and the calculations can be made in the same way by substitution in the formulae as in the case for the optical mask placed in the rear as discussed above.

As a general rule, the placing of the mask either forward or to the rear of the aperture stop is determined by the relative algebraic signs of coma and astigmatism. When the signs are alike, the mask is placed to the rear of the aperture. When the signs are unlike, the mask is placed forward with the aperture diaphragm. In the example illustrated in FIGS. 1, 2, 6 and 8(a) the coma and astigmatism are both positive, thus indicating that the principal correction is to be achieved by an optical mask placed to the rear of the aperture.

This rule follows from the fact that the positive rays $(+M, +D, +D')$ are deflected or eliminated by an optical mask placed to the rear of the aperture diaphragm whereas the negative rays $(-, -D, -D')$ are deflected or eliminated by an optical mask forward from the aperture diaphragm, according to the rules given above, and the formation, either by positive or negative rays of the "tail" portion of the image for the different combinations of coma and astigmatism. Thus in the example of FIGS. 1, 6, and 8(a) the tail of the image is made up of positive rays as is also the tail portion of the image shown in FIG. 8(b) (negative coma and negative astigmatism) so that each of these two cases is corrected by an optical mask properly placed to the rear of the aperture. In the examples of FIG. 8(c) (positive coma and negative astigmatism) and FIG. 8(d) (negative coma and positive astigmatism) the tail of the image is made up of negative rays and corrected by an optical mask properly placed forward from the aperture.

In the few cases where the objective is afflicted with relatively pure coma or relatively pure astigmatism, the images are such that both the $+M$ and the $-M$ rays are substantially displaced from the P ray. In such cases correction is best accomplished by the use of at least two optical masks, i.e., two separate corrections—one in front of the aperture stop and one to the rear thereof.

In FIG. 9 are illustrated for the case of pure positive coma the image curves (i.e. circles) formed by rays of three zones, such as are shown in FIG. 3, at the sagittal and tangential focal plane. The tail portion of the image curves is formed by plus and minus M rays and plus and minus D and D' rays. In fact each image curve is composed of two superimposed image curves (circles), one made up of plus rays, the other of minus rays, explaining the need for two separate corrections, one in front and the other in the rear.

In FIG. 10 is illustrated the sagittal image curves (straight line) for pure positive astigmatism formed by three zones such as shown in FIG. 3. The images found by the inner zones are increasingly shorter and are superimposed on the images formed by the outer zones. In this case there are two tails decreasing in brightness extending away from the principal ray (on which is centered the circle of confusion). The $+M$ ray is at the end of one tail and the $-M$ ray at the end of the other, and the nearby points are made up of the foci of "D pairs" and of M rays (of the same sign) of inner zones. To bring the image within the circle of confusion (centered at or near the principal ray) a certain number of plus rays and also of minus rays need to be deflected or intercepted explaining the need for two separate correctors—one to the rear and one in front.

In a few cases of mixed coma and astigmatism in which the astigmatism largely predominates, the image pattern will have two tails running out in opposite directions from the brightest region of the image near the principal ray, with one tail much longer than the other so that the circle of confusion centered at or near the principal ray does not contain all even of the smaller tail. In this case, each tail is corrected independently of the other, according to the rules given above, on each side of the aperture, the maximum angle of acceptable coma astigmatism as well as the maximum zone of acceptable aberration being much larger for the smaller tail. One such optical mask is really a principal corrector, the other supplemental.

Since the invention is explained on the basis of using the sagittal focus, though other foci can also be used, it might seem advantageous that the lens to be corrected or to embody the invention should be constructed to have a flat sagittal field. However, though a flat sagittal field is advantageous, it is not necessary. Image planes adjacent to and in the neighborhood of the plane of the sagittal focus have image patterns of similar shape and ray distribution with tail portions away from and brighter head portions near the principal ray which, when the sagittal focus is corrected as above, receive simultaneously the same type of correction. Thus, the effect of field curvature in producing different foci at different distances from the axis on the flat image plane does not nullify the correction.

In a few types of lens applications the marginal field angle and the maximum zone of acceptable coma-astigmatism may vary continuously from meridional plane to meridional plane. For instance, the marginal field angle is determined by the edges rather than by the corners of a rectangular image field (in which case the inside edge of the optical mask is easily plotted, using the principles given above, and is in the form of four curves intersecting in pairs at each of four points, each point lying in a meridional plane containing a corner of the rectangular field); or when the image and object fields are not centered on the optical axis, as in certain types of projection.

In some other unusual cases, the maximum acceptable coma-astigmatism angle may vary continuously from meridional plane to meridional plane, either alone or along with the marginal field angle and the maximum acceptable coma astigmatism zone, so that each plane has a slightly altered limiting and optimum position; or expressed in another way, as the meridional plane rotates about the optical axis the limiting and optimum positions may vary continuously so that the inner edge of the optical mask will be a twisted curve in space and the optical mask itself a warped surface. Such a case can arise with lens assemblies that have different magnifications in different directions from the lens axis due to surface elements that are not surfaces of revolution.

For the various types of applications or assemblies in which the limiting or optimum position varies on rotation of the meridional plane, the shape and position of the optical mask can be determined by plotting the positions of the inside edge for the limiting or optimum positions and also the outside edge in each of a series of meridional planes spaced at equal angles surrounding the axis, connecting these points by spacial curves, and these curves by surfaces. The curves may be twisted and the surfaces warped.

A specific example of the placing of an optical mask is as follows: An 83 mm. f/3.5 anastigmat lens, having elements as are approximately shown in FIG. 1 was found, after determining the nodal points, to have a focal length of $f=3.307$ inches and that the rear focal plane was 2.756 inches behind the rearmost surface; and that after determining the nodal points of the part of the lens to the front of and the part to the rear of the aperture, the positions of the entrance and exit pupils were determined, the exit pupil being 0.026 inch in front of the aperture and 3.118 inches in front of the rear focal plane; the diameter of the aperture diaphragm was found to be 0.780 inch, of the entrance pupil 0.94 inch and of the exit pupil 0.84 inch. The distance $h$ from the center to the corner of the film (2¼" x 2¼") was 1.59 inches; the maximum acceptable coma-astigmatism angle was found at 0.21 inch from the center of the field, positive coma and positive astigmatism (mostly the latter) being present; and the radius of the maximum zone of acceptable coma-astigmatism was found to be 0.03 inch. The aberrations were such that the primary correction was obtained by an optical mask to the rear of the lens system and from the above data it was determined (using the previously given symbols) that $\rho=0.42$ inch, $s=3.12$ inches (for distance objects) and $h=1.59$ inches, so that $\tan \alpha=0.510$, $\tan \alpha_c=.0674$; and $Z_0=0.03$ inch. From these data, using the formulae given above, it was found that $d_0=0.687$ inch (the optical mask thus being 0.362 inch behind the rear surface), $r_0=0.374$ inch and $R_0=0.678$ inch.

Where it is desired to place the optical mask between elements of the conventional objective, formulae similar to I through VI are readily derived by ray tracing and treatment similar to that described in connection with those formulae.

In FIG. 11 a reflective image-forming optical system 40 having a diaphragm 41 to control its aperture, reflecting surfaces 42, 43, and an exit pupil 44, is shown imaging a pencil 45 of light rays, of which $+M$ and $-M$ are shown on an image plane 46. In the system shown in FIG. 11 the entrance pupil is the same as the aperture stop.

Due to comatic and astigmatic aberration the $+M$ ray and its adjacent rays in the pencil of light impinge on the focal plane to form a tail such as that illustrated in FIG. 6. An annular optical mask 47 is disposed behind the reflecting surfaces so as to intercept the $+M$ ray and adjacent rays to remove the tail and to improve the definition and sharpness of the composite image. The calculation of the dimensions of the optical mask and its location with respect to the exit pupil is identical to that described above for a refracting lens system. The optical mask may also be used in front of the aperture if the aberrations are such that certain negative rays need to be removed, as discussed above, to improve the image. In some optical assemblies containing reflecting elements, as in reflecting telescopes, the image field is on the same side of the assembly as the object field. However, the rules given above for the position and size of the optical mask are in no way altered, the limiting position being determined by the intersection of the $+M_c$ ray and the projection of the P ray, or the $-M_c$ ray and the projection of the P ray, and the optimum position by the intersection of the $+M_c$ and $+M_0$ rays or of the $-M_c$ and $-M_0$ rays. In some cases the pencils may be deflected by mirrors, changing the position of the image plane, but the same rules hold.

The position and size of the optical mask determined as hereinabove described for relatively wide apertures and distant object points serve to give a satisfactory correction when the lens is stopped down to smaller apertures or applied to closer object points. However, the maximum degree of correction is obtained by a specific position and size of the optical mask for each aperture and object distance combination. In such cases an adjustable optical mask which can be moved axially and contracted and enlarged by controls calibrated for each aperture focal distance combination is of distinct usefulness. Such adjustments can be coupled to work automatically.

As previously stated, the present invention not only improves (by intercepting certain rays) the sharpness and definition of images that would otherwise be affected by coma and astigmatism, but it also makes use of the light rays so intercepted to further improve the quality of the photographic image. This is accomplished by employing the principle of latent image intensification in a novel way. For a description of the principles of latent image intensification and its relationship to the present invention, reference is made to FIGS. 12 through 16.

FIG. 12 illustrates what is commonly referred to as an "H and D" curve; that is, a curve of photo-image density values plotted as a function of the log of the integrated quantity of light reaching a given point in the photosensitive surface, i.e., exposure. Exposure can be increased either by increasing the aperture of the photographic objective or by increasing the length of time the shutter is open.

The principal characteristic of the H and D curve is that the initial increases in exposure do not produce appreciable increases in density of the produced image. The initial portion 50 of the curve is relatively flat, being usually referred to as the "toe" of the curve. The toe is identified in FIG. 12 as the portion lying between 0 and $E_1$. The length of the flat or toe portion of the curve is sometimes used as one of the indices of the particular photographic emulsion having such curve, the quantity being termed "inertia" and being expressed in exposure units, e.g., meter-candle-seconds. Following the initial exposure, i.e., the inertia exposure, the curve rises relatively linearly with increase in exposure, such portion 51 of the curve lying between $E_1$ and $E_2$ and being referred to usually as the latitude of the particular emulsion. Thereafter the curve flattens off and further increases in exposure do not produce appreciable increases in density. The latter section 52 of the curve is usually referred to as the knee or shoulder.

In order to produce a natural-appearing photographic image in which the relative intensities of contrasting light and dark portions approximate those in the original object, the exposure range must fall within the $E_1$ to $E_2$ or latitude portion of the curve so that a given increase in the exposure produces a proportional increase in density.

Since the density produced in any part of a photographic image is a function of the total amount of light received regardless of whether such light is received in a series of successive exposures or whether all of the light is received in a single exposure, efforts have been made in the past to pre-sensitive photographic emulsions by exposing the photosensitive surface to a relatively weak, uniformly-distributed light prior to the actual exposure producing the desired image. This is regulated to produce and exposure approximately equal to $E_1$ in FIG. 12 so that the subsequent exposure produces more satisfactory contrasts in the less exposed portions due to the fact that the exposures of these parts of the image have been made to fall substantially within the above-mentioned latitude portion of the curve.

The pre-exposure method just described is not entirely satisfactory, because the latent image intensification effect (as it is termed) deteriorates with the passage of time, being considerably more effective immediately after the pre-exposure. Also, if the pre-exposure used to produce latent image intensification is made through the conventional photographic objective, such, for example, as by pointing the camera to the sky with the objective stopped down as far as possible, and making a very short exposure, the result is apt to show a non-uniformity of the intensification due to the falling off of illumination toward the edges of the photosensitive surface.

In a preferred form of the present invention where a transparent or translucent optical mask is used, the light ray intercepted by the optical mask are redistributed over the photosensitive surface so as to produce the effect of latent image intensification simultaneously with the actual exposure producing the photographic image. Thus, being concurrent with the main exposure and inherently in proper proportion to the image exposure, the intensification is accomplished with maximum effectiveness. In the event that the light intercepted by the mask to correct the image for comatic-astigmatic aberration is insufficient to accomplish the desired amount of latent image intensification, or if an opaque optical mask is used, supplemental light may be supplied to make up the deficiency.

If the optical mask is transparent, by an appropriate selection of the curvature of the surface of the mask the distribution of light over the photosensitive surface may be deliberately made non-uniform in accordance with a predetermined pattern; that is, increasing or decreasing from the center to the edge of the image area, as desired. This provides the important advantage that non-uniformity, or as it is sometimes called "falling off" of the image density in the uncorrected objective can in a large part be compensated. A curvature can also be given the surface of a translucent optical mask to provide for the same type of light distribution of intercepted light.

FIG. 13 is a graphic representation of the light distribution just described. Three curves are shown and identified by the reference characters 60, 61 and 62, respectively. The first curve 60 illustrates the approximate distribution of "illumination" in a conventional photographic objective. The ordinate height of the curve represents the relative amount of light received on the photographic image plane from a uniformly bright object area at various points, the location of the points being referred to in the present instance by the angular displacement from the optical axis.

The upwardly sloping curve 61 represents approximately the distribution of corrective illumination which results from the use of the corrective optical mask or supplemental light as described above. While the uncorrected distribution curve 60 falls off toward the edges of the image area, the corrective illumination increases toward the edges as indicated by the curve 61.

The resultant curve 62 is derived by adding the ordinates of the curves 60 and 61, and is relatively flat as compared with the curve 60.

On first examination, it would appear that the correction just described would merely result in a fogging or graying of the peripheral portions of the image area without producing an improved definition or separation of shadow detail. Because of the aforementioned latent image intensification effect, however, the quality of the image in the peripheral area is improved to a substantial degree, thus giving a much more uniform separation of shadow detail across the entire image area than has been possible heretofore.

If the light intercepted by the optical mask is to be used to effect the illumination correction to an optimum degree, it is necessary to arrange the refracting, reflecting or diffusing power of the corrective optical mask so that the curve of illumination distribution supplied by it is such that the minimum combined exposure at every angle approximates the threshold level. Corrective illumination of substantially this type will be referred to as compensating exposure.

For example, if the optical mask is transparent and the light intercepted by it is to be distributed in a compensating manner to the light reaching the image plane through the center of the optical mask, the surface of the optical mask must be shaped to achieve the desired light distribution by refraction of the intercepted light. FIG. 14 illustrates schematically in axial section a transparent refractive optical mask 70 which produces the desired compensation. The optical mask is shown spaced from an exit pupil 71 and disposed coaxially about the optical axis 72 of an objective 73. For purposes of illustration, light rays 74 and 75 graze the upper edge of the aperture to intercept the uppermost portion of the mask and are refracted onto an image plane 76 as indicated, 74 and 75 on refraction being 74A and 75A, respectively. Light ray 77 grazes the lower edge of the exit pupil to strike the uppermost portion of the mask and on refraction becomes 77A; and light ray 78 is at an intermediate angle between 74 and 77 and on refraction becomes 78A. 74A, 77A and 78A are all shown emerging from the same point 70C on the rear surface 70B of the optical mask. For each such point as 70C on the rear surface the ray that grazes the upper edge of the exit pupil meets the image plane closer to the optical axis than any other ray through that point; and point by point along the rear surface the ray grazing the exit pupil can be refracted to a desired position on the image plane, never meeting the image plane closer than the boundary from which compensating illumination is desired. These rays can be refracted in increasing amounts toward the edge of the field. Thus ray 74 is refracted as 74A to the position 74B on the image plane at which compensating illumination is to commence, whereas ray 75 is refracted as 75A to the edge of the image field at 75B, and rays grazing the exit pupil lying between 74 and 75 are refracted to the intermediate positions on the image plane between points 74B and the edge of the field 75B. The rays not grazing the upper edge of the exit pupil and the skew rays (not in the meridional plane) will from each point on surface 70B be refracted to points farther away from the optical axis than will the ray grazing the upper edge of the exit pupil, and thus will reinforce the illumination of the outer areas of the image field.

The shape of the surfaces of the optical mask necessary to produce the desired refractions are determined in this case first by setting for simplicity the forward surface 70A normal to the meridional rays grazing the upper edge of the exit pupil (though other shapes are possible) so that for these rays at this surface the refraction is zero (or, for other surface shapes, can be easily calculated). The shape of the mask rear surface 70B is then found by calculating the direction of the normal for each of a series of spaced incident rays grazing the upper edge of the exit pupil such as ray 75. Since the direction of the refracted ray 75A is predetermined as described above, the angle $\theta$ between the projection 75C of incident ray 75 and the refracted ray 75A can be measured and the direction of the normal $N_{75}$ at the point of refraction, calculated from the formula $$\tan \phi' = \frac{\sin \theta}{n' - \cos \theta}$$

in which $n'$ is the index of refraction of the optical mask and $\phi'$ is the angle between the normal and the incident ray 75. The slope of the surface 70b being at right angles to the normal, can be drawn for each of a series of incident rays grazing the exit pupil, ranging from 74 to 75; and a smooth continuous surface curve drawn embodying these slopes. This curve may be considered a first close approximation since the points of refraction were previously drawn on the incident rays on or close to surface 70A, whereas they should lie on the calculated surface 70B. A second approximation for 70B, generally not necessary, may be made by redrawing the refracted rays going to the desired positions on the image plane, and coming from points of refraction on the first approximation curve. Additional approximations can be made in the same way until the required accuracy is achieved.

In practice further modifications of the surface shape can be necessary, but which are more tedious to calculate so that final adjustments are best made by empirical methods which can be readily accomplished by the use of any type of transparent material which is easily worked. For example, the optical mask may be formed of one of the plastics such as Lucite, which may be easily shaped as required to achieve the desired light distribution. It is a relatively simple procedure to determine experimentally the falling off of illumination for an objective, and it is also easy to adjust the surface of an optical mask made of plastic to a curvature which will provide compensating lighting for any given objective.

The surface of the optical mask can be curved in a great variety of ways to achieve compensating light distribution, and FIG. 15 illustrates another type of surface which can be developed on an optical mask 80 to achieve compensating lighting. The optical mask is shown spaced to the rear of an exit pupil 81 and is coaxially disposed about the optical axis 82 of an objective 83. The rear surface 84 of the optical mask is of an irregular shape, being divided into concave and convex zones 85 and provides for non-uniform refraction of light in a manner similar to that described for the optical mask illustrated in FIG. 14. Lines $N_a$, $N_b$, ... $N_h$ are drawn normal to the rear surface of the optical mask to show the various points of inflection which mark the division between the individual zones. The arrangement in FIG. 15 has the advantage that each of the difference zones 85 of the optical mask supplies light in a compensating manner to the image plane, the surfaces for each zone either convex or concave being determined in a manner similar to that described for the single zone optical mask of FIG. 14. Therefore, a portion of the optical mask, for example the outer area, can be stopped down to reduce the total light striking the image plane without reducing its effectiveness in supplying light compensatingly.

FIG. 16 illustrates another form which an optical mask 90 can take to achieve complemental lighting of the image plane. The optical mask is spaced from an aperture 91 and disposed coaxially about the optical axis 92 of an objective 93. The optical mask is made of a translucent or light-diffusing material such as ground glass or opal glass. The rear surface 94 of the optical mask is disposed so that an increasing portion of this surface can illuminate the outer portions of the image field. For the purposes of illustration a light ray 95 is shown schematically as being intercepted by the optical mask. Light from the ray emerges from the diffusing surface in the manner shown by the vectors 96, 97, 98; i.e., the amount of light theoretically is zero in a direction parallel to the diffusing surface and increases to a maximum in a direction perpendicular to the diffusing surface. Thus, a majority of the light in the intercepted ray 95 is diffused in a direction perpendicular to the diffusing surface while lesser amounts are emitted at angles to the surface. Thus, with the ground glass surface slanted to the proper angle or curved in the proper direction, any desired amount of compensating lighting may be achieved. The shape of the optical mask is subject to calculation and further empirical adjustment, as in the case outlined for an optical mask made of refracting material to determine the curvature of the diffusing surface. Appropriate shielding with opaque materials may be convenient in place of excessive inclination of the surfaces to prevent some light from reaching areas of the image field on which light is unwanted, as shown by a shield 99 in FIG. 16. The shield is illustrated in the form of a truncated cone coaxially disposed to the rear surface of the mask with the small end of the cone near the mask, but the shielding may take a great variety of forms.

Further forms which the optical mask can take to achieve supplemental lighting of the image plane involve the use of a reflecting surface or surfaces on the side of the optical mask facing the lens system, the shape of the surface being such as to reflect the intercepted rays onto a second reflecting surface which will reflect the rays onto the image plane in the manner desired. The shapes of the surfaces can be determined in a manner analogous to methods described above for the refracting optical mask. The reflecting surface on the optical mask can be either in a single or in multiple zones. A further form has a reflecting diffusing surface, in place of either reflecting surface, and the shape of this diffusing surface is determined in a manner analogous to that for the optical mask of translucent diffusing material. Additional arrangements to achieve supplemental lighting can be used employing various combinations and permutations of refracting, reflecting, and diffusing elements.

In some cases with the types of optical masks discussed above a certain amount of supplementary light that might be of use on the image field goes outside the image field. In these cases, auxiliary mirrors of proper shape and location can be used to reflect the light in a suitable distribution back onto the image field.

Compensating lighting of the focal plane can also be accomplished in the manner illustrated in FIG. 1; i.e., supplemental light is supplied from the light source 28 independently of the optical mask. The light source can be either external or an internal, artificial light. By way of example, the light source 28 of FIG. 1 may be a ring having a light emitting face directed toward the image area. The light emitting face may be composed of translucent, transparent or reflecting material arranged to emit light rays as illustrated in FIG. 1. In using this arrangement, the light source 28, shown schematically in FIG. 1, may utilize the principles explained for any of the above-described optical masks which provide compensating lighting.

In the claims which follow, the term "space of transmission" means the space occupied by the sum-total of those rays transmitted by the image forming optical assembly, before, during and after transmission, which impinge upon the space within the boundaries of the image area. As used in the specification and claims, the term "intercept" means either to alter the course of or to completely stop.

We claim:

1. In combination with an image-forming optical assembly having an optical axis, an aperture stop and discernible extra-axial aberration, an optical mask having a central opening positioned behind the aperture stop at a distance not greater than a limiting distance $d_1$ from the exit pupil of said assembly where $$d_1 = \frac{\rho}{\tan \alpha - \tan \alpha_c + \frac{\rho}{s}}$$

and where $\rho$ equals the radius of said exit pupil, $\alpha_c$ equals the angle between the optical axis of the assembly and the principal ray of those light rays from the object producing a circle of confusion of maximum acceptable diameter, $\alpha$ equals the maximum angle formed between an operative principal ray from the object and the optical axis, and $s$ equals the distance from the exit pupil of the assembly to the image plane, the optical mask extending away from the optical axis of the assembly to intercept at least some of the image-forming light rays which would otherwise strike the peripheral zone of image area.

2. Apparatus as defined in claim 1 wherein the optical mask is opaque.

3. Apparatus as defined in claim 1 wherein the optical mask is translucent for passing diffused light rays.

4. Apparatus as defined in claim 1 wherein the optical mask comprises transparent light-refracting means for distributing the intercepted light rays over the peripheral part of the image area of the optical assembly.

5. Apparatus as defined in claim 1 further including a supplemental light source and means positioned adjacent the optical mask for directing light from said source toward the image area of said image forming optical assembly, the supplemental light directed by said light-directing means substantially all falling on a peripheral area in the image plane of the optical assembly to compensate for light rays normally falling on the image area but cut off by the mask.

6. The construction of claim 1 further characterized in that $r_1$, the inside radius of the optical mask, equals $$\rho + d_1 \left( \tan \alpha_c - \frac{\rho}{s} \right)$$

where $d_1$ equals the selected distance between the optical mask and exit pupil.

7. In combination with an image-forming optical assembly having an optical axis, an aperture stop and discernible extra-axial abberation, an optical mask positioned in front of the aperture stop at a distance not greater than a limiting distance $d_1$ from the entrance pupil of the assembly where $$d_1 = \frac{\rho}{\tan \alpha - \tan \alpha_c + \frac{\rho}{s}}$$

and where $\rho$ equals the radius of the entrance pupil, $\alpha_c$ equals the angle between the optical axis of the assembly and the principal ray of the pencil of light rays from the object producing a circle of confusion of maximum acceptable diameter, $\alpha$ equals the maximum angle formed between an operative principal ray from the object and the optical axis, and $s$ equals the distance from the entrance pupil of the assembly to the object plane, the optical mask extending away from the optical axis of the assembly to intercept at least some of the image-forming light rays which would otherwise strike the peripheral zone of image area.

8. Apparatus as defined in claim 7 further including a supplemental light source and means for directing light from said source toward the image area of said image-forming optical assembly, the supplemental light directed by said light-directing means substantially all falling on a peripheral area in the image plane of the optical assembly to compensate for light rays normally falling on the image area but cut off by the mask.

9. The construction of claim 7 further characterized in that $r_1$, the inside radius of the optical mask, equals $$\rho + d_1 \left( \tan \alpha_c - \frac{\rho}{s} \right)$$

where $d_1$ equals the selected distance between the optical mask and the entrance pupil.

10. In an optical system the combination comprising an image-forming optical assembly having an optical axis, an aperture stop and discernible coma and astigmatism of like signs and an optical mask positioned behind the aperture stop at a distance $d_0$ in each meridional plane from the exit pupil where $$d_0 = \frac{\rho - Z_0}{\tan \alpha - \tan \alpha_c + \frac{\rho - Z_0}{s}}$$

and having an inside radius $r_0$ in said meridional plane where $$r_0 = \rho + d_0 (\tan \alpha_c - \rho/s)$$

and where $\rho$ equals the radius of said exit pupil, $\alpha_c$ equals the angle between the optical axis of the assembly and the principal ray from the object in said plane emerging from the optical assembly of the pencil of rays producing a circle of confusion of maximum acceptable diameter, $\alpha$ equals the maximum angle formed between an operative principal ray from the object in said plane emerging from the optical assembly and the optical axis, $s$ equals the distance from the exit pupil of the assembly to the image plane, and $Z_0$ is the maximum radius, as determined at the exit pupil, of pencils of rays from the object whose principal ray forms the said angle $\alpha$ with the optical axis and whose image is contained within a circle of confusion of maximum acceptable diameter, the optical mask extending away from the optical axis of the assembly to intercept at least some of the image-forming light rays which would otherwise strike the peripheral zone of image area.

11. In an optical system the combination comprising an image-forming optical assembly having an optical axis, an aperture stop and discernible coma and astigmatism of opposite signs and an optical mask positioned in front of the aperture stop at a distance $d_0$ in each meridional plane from the entrance pupil where $$d_0 = \frac{\rho - Z_0}{\tan \alpha - \tan \alpha_c + \frac{\rho - Z_0}{s}}$$

and having an inside radius $r_0$ in said meridional plane where $$r_0 = \rho + d_0 (\tan \alpha_c - \rho/s)$$

and where $\rho$ equals the radius of said entrance pupil, $\alpha_c$ equals the angle between the optical axis of the assembly and the principal ray from the object in said plane entering the optical assembly of the pencil of rays producing a circle of confusion of maximum acceptable diameter, $\alpha$ equals the maximum angle formed between an operative principal ray from the object in said plane entering the optical assembly and the optical axis, $s$ equals the distance from the entrance pupil of the assembly to the object plane and $Z_0$ is the maximum radius, as determined at the entrance pupil, of pencils of rays from the object whose principal ray forms the said angle $\alpha$ with the optical axis and whose image is contained within a circle of confusion of maximum acceptable diameter, the optical mask extending away from the optical axis of the assembly to intercept at least some of the image-forming light rays which would otherwise strike the peripheral zone of image area.

12. In an optical system, the combination comprising an image forming optical assembly having an optical axis, an aperture, entrance and exit pupils, an image area of fixed boundaries, and an object area, the optical assembly being subject to extra-axial aberrations, the aberrations resulting in a point source of light in the object area being focused within a circle of confusion in the image area, the circle of confusion within which the light rays of a point source are imaged being discernibly greater in a peripheral zone of the image area than in a central zone, the juncture between the central zone and surrounding peripheral zone being defined as the locus of the point source images having a maximum acceptable circle of confusion, and an optical mask having an opening through which passes the optical axis, the edge of the opening in the optical mask being positioned between the aperture and the image area a distance $d_0$ from the plane of the exit pupil as measured in any plane containing the optical axis, where $$d_0 = \frac{\rho - Z_0}{\tan \alpha - \tan \alpha_c + \frac{\rho - Z_0}{s}}$$

and the edge of the opening in the mask is a radial distance $r_0$ from the optical axis as measured in the measuring plane for $d_0$ containing the optical axis, where $$r_0 = \rho + d_0 \left( \tan \alpha_o - \frac{\rho}{s} \right)$$

and $\rho$ is the radius of the exit pupil in the measuring axial plane, $\alpha$ is the angle formed in the measuring axial plane by the optical axis and an operative principal ray emerging from the optical assembly from a point source of light in the object area and falling on the boundary of the image area, $\alpha_c$ is the angle formed in the measuring axial plane by the optical axis and a principal ray emerging from the optical assembly from a point source of light in the object area and falling on the juncture of the central and peripheral zones in the image area, $Z_0$ is the maximum radius, as measured at the exit pupil in the measuring axial plane, of the pencil of rays emerging from the optical assembly from the point source of light whose principal ray forms the angle $\alpha$ and whose image is contained within an acceptable circle of confusion, the radius being measured at the exit pupil by projecting the path of the rays after emerging from the optical assembly back to the plane of the exit pupil, $\rho$, $\alpha$, $\alpha_c$ and $Z_0$ being measured on the same side of the optical axis in the measuring plane, and $s$ is the distance from the exit pupil to the image area as measured parallel to the optical axis.

13. In an optical system, the combination comprising an image forming optical assembly having an optical axis, an aperture, entrance and exit pupils, an image area of fixed boundaries, and an object area, the optical assembly being subject to extra-axial abberations resulting in point sources of light in the object area being focused within a circle of confusion in the image area, the circle of confusion within which the light rays of a point source are imaged being discernibly greater in a peripheral zone of the image area than in a central zone, the juncture between the central zone and surrounding peripheral zone being defined as the locus of the point source images having a maximum acceptable circle of confusion, and an optical mask having an opening through which passes the optical axis, the edge of the opening in the optical mask being positioned between the aperture and the object area a distance $d_0$ from the plane of the entrance pupil as measured in any plane containing the optical axis, where $$d_0 = \frac{\rho - Z_0}{\tan \alpha - \tan \alpha_c + \frac{\rho - Z_0}{s}}$$

and the edge of the opening in the mask is a radial distance $r_0$ from the optical axis as measured in the measuring plane for $d_0$ containing the optical axis, where.

$$r_0 = \rho + d_0 \left( \tan \alpha_o - \frac{\rho}{s} \right)$$

and $\rho$ is the radius of the entrance pupil in the measuring axial plane, $\alpha$ is the angle formed in the measuring axial plane by the optical axis and an operative principal ray entering the optical assembly from a point source of light in the object area and falling on the boundary of the image area, $\alpha_c$ is the angle formed in the measuring axial plane by the optical axis and a principal ray entering the optical assembly from a point source of light in the object area and falling on the juncture of the central and peripheral zones in the image area, $Z_0$ is the maximum radius, as measured at the entrance pupil in the measuring axial plane, of the pencil of rays entering the optical assembly from the point source of light whose principal ray forms the angle $\alpha$ and whose image is contained within an eccept-able circle of confusion in the image area, the radius $Z_0$ being measured by projecting rays along straight lines to the plane of the entrance, $\rho$, $\alpha$, $\alpha_c$, and $Z_0$ being measured on the same side of the optical axis in the measuring plane, and $s$ is the distance from the entrance pupil to the object area as measured parallel to the optical axis.

References Cited in the file of this patent
UNITED STATES PATENTS

| | | |
|---|---|---|
| 24,356 | Miller et al. | June 7, 1859 |
| 773,202 | Ewing | Oct. 25, 1904 |
| 1,035,408 | Beck | Aug. 13, 1912 |
| 1,545,869 | Wiedert | July 14, 1925 |
| 1,551,291 | Evans | Aug. 25, 1925 |
| 1,734,780 | Simjian | Nov. 5, 1929 |
| 1,892,162 | Richter | Dec. 27, 1932 |
| 1,953,471 | Eich | Apr. 3, 1934 |
| 2,356,694 | Potter et al. | Aug. 22, 1944 |
| 2,473,174 | Pifer | June 14, 1949 |
| 2,516,724 | Roossinov | July 25, 1950 |
| 2,550,685 | Garutso | May 1, 1951 |

FOREIGN PATENTS

| | | |
|---|---|---|
| 622,100 | France | Feb. 19, 1927 |